(12) United States Patent
Miura et al.

(10) Patent No.: US 7,045,708 B2
(45) Date of Patent: May 16, 2006

(54) PROTECTIVE PLATE INSTALLATION STRUCTURE

(75) Inventors: Hideya Miura, Toyoake (JP); Yasuaki Kawakami, Toyota (JP); Hidemi Masuda, Inazawa (JP); Yoshiki Shimoda, Inazawa (JP); Keita Moritsu, Okazaki (JP)

(73) Assignees: NIFCO Inc., Yokohama (JP); VTEC Co.,Ltd., Anjou (JP); FTS Co.,Ltd., Inazawa (JP)

( * ) Notice: Subject to any disclaimer, the term of this patent is extended or adjusted under 35 U.S.C. 154(b) by 0 days.

(21) Appl. No.: 11/129,347

(22) Filed: May 16, 2005

(65) Prior Publication Data

US 2005/0269119 A1    Dec. 8, 2005

(30) Foreign Application Priority Data

Jun. 3, 2004    (JP) ............................. 2004-165755

(51) Int. Cl.
*H02G 3/10*    (2006.01)
(52) U.S. Cl. ............................ 174/48; 174/50; 174/67; 220/3.2; 220/241
(58) Field of Classification Search ................ 174/66, 174/67, 50, 135, 17 CT, 48, 47; 220/241, 220/242, 3.8, 3.2, 694, 675; 280/834; D13/156
See application file for complete search history.

(56) References Cited

U.S. PATENT DOCUMENTS 4,895,268 A * 1/1990 Hyde ..................... 220/694

FOREIGN PATENT DOCUMENTS

| JP | S63-16244 | 2/1988 |
| JP | 2606887 | 11/2000 |
| JP | 2003-291669 | 10/2003 |

* cited by examiner

*Primary Examiner*—Dean A. Reichard
*Assistant Examiner*—Angel R. Estrada
(74) *Attorney, Agent, or Firm*—Manabu Kanesaka

(57) ABSTRACT

A protective plate installation structure includes a base welded to a protection member, a clip for engaging the base, and a protective plate for protecting the protection member. The base has a first engaging portion, and a receiving portion. The clip has a second engaging portion at one end for engaging the first engaging portion when the clip is moved along an axis of the base, and an umbrella portion formed at the other end thereof. The protective plate has an installation opening so that when the clip is attached to the base through the installation opening, the protective plate is held between the umbrella portion and the receiving portion.

8 Claims, 6 Drawing Sheets

PROTECTIVE PLATE INSTALLATION STRUCTURE

BACKGROUND OF THE INVENTION AND RELATED ART STATEMENT

The present invention relates to a protective plate installation structure with a clip for installing a protective plate for protecting a fuel tank with a specific distance from a fuel tank formed of a plastic.

A fuel tank made of a plastic is located under a vehicle. Also, an exhaust pipe is located under or side of the fuel tank and heat is radiated therefrom. The fuel tank is located under the vehicle, so that the fuel tank may be damaged by a small rock bouncing off from a road. Accordingly, under or on a side of the fuel tank, a protective plate is installed with a clip to protect the fuel tank from the radiation heat and impact.

In Patent Document 1, as shown in FIGS. 6 and 7, a disc shape pedestal 102 is provided at an end of a clip holder 100 with a prismatic shape, and is attachable to a fuel tank 104. A hollow portion 106 with a dented prismatic shape is provided at a center of one side surface 100A of the clip holder 100. An engaging opening 108 is provided at a center of the other side surface of the clip holder 100, and a guide opening 110 is formed in a portion from the side surface 100A to the lock opening 108 of the clip holder 100.

A clip body 112 is capable of engaging the clip holder 100. An insertion part 114 is formed in the clip body 112 for inserting into the hollow portion 106, and the insertion part 114 shifts in parallel to insert into the hollow portion 106. A lockable main body 116 is provided at a center of the insertion part 114 for locking with the engaging opening 108. When the insertion part 114 is inserted into the hollow portion 106, the insertion part 114 is guided to the engaging opening 108 along a guide opening 110, and is locked with the engaging opening 108.

A flat plate shape stopper 118 is formed on the main body 116 in parallel to the insertion part 114, and both ends thereof are bent toward an opposite side of the insertion part 114. A pair of claws 120 is formed on a tip of the main body 116. The claws 120 penetrate through a penetration opening 122A formed in the protective plate 122, and engage a peripheral portion of an opening 126A of the flat plate 126 formed in the protective plate 122. In this state, the protective plate 122 is supported by the flat plate 126 and the stopper 118, and the protective plate 122 is restricted to move right and left sides by an urging force of the stopper 118.

The insertion part 114 of the clip body 112 is inserted into the hollow portion 106 of the clip holder 100 in a direction perpendicular to a direction that the claws 120 on the tip of the clip body 112 engage the peripheral portion of the opening 126A of the flat plane 126. Accordingly, an operation is performed in two directions, thereby making workability poor.

It is necessary to provide a space for the insertion part 114 to be shifted in parallel, so that the insertion part 114 of the clip body 112 is shifted in parallel and inserted in the hollow portion 106 of the clip holder 100. It is difficult to take out the protective plate 112 for maintenance purpose.

Patent Document 1: Japanese Utility Model Publication No. 63-16244

In view of the problems described above, an object of the present invention is to provide a protective plate installation structure wherein workability is good and it is easy to remove a protective plate when maintenance of a vehicle is required.

Further objects and advantages of the invention will be apparent from the following description of the invention.

SUMMARY OF THE INVENTION

According to a first aspect of the present invention, a protective plate installation structure includes a base with a cylindrical shape formed of a plastic to be welded to a fuel tank formed of a plastic; a clip formed of a plastic for engaging the base; and a protective plate disposed between the clip and the base for protecting the fuel tank and having an installation opening for inserting the clip. A portion to be engaged is formed on the base, and an engaging portion is formed on one end of the clip for engaging the portion to be engaged when the clip moves along an axis of the base. An umbrella portion is formed on the other end of the clip for holding the protective plate with a receiving surface formed on one end of the base in a state that the engaging portion engages the portion to be engaged.

In the first aspect of the present invention, the base with a cylindrical shape is capable of adhering to the fuel tank, and the clip is capable of engaging the base. The installation opening is formed in the protective plate for inserting the clip. The portion to be engaged is formed on the base. The engaging portion is formed on the one end of the clip. In a state that the clip is inserted into the installation opening, when the clip moves along the axis of the base, the engaging portion engages the portion to be engaged. The umbrella portion is formed on the other end of the clip, so that the protective plate is supported between the umbrella portion and the receiving surface on the one end of the base in the state that the engaging portion engages the portion to be engaged.

When the clip moves along the axis of the base, the engaging portion of the clip engages the portion of the base to be engaged of the base, and the protective plate is supported between the umbrella portion of the clip and the receiving surface of the base. That is, when the protective plate is mounted on a side and under the fuel tank, an operation is performed in one direction, thereby making the operation easy. It is possible to mount the protective plate in a narrow space since the clip moves along the axis of the base.

According to a second aspect of the present invention, in the protective plate installation structure in the first aspect, an annular groove is provided inside an adhesion part of the base which adheres with the fuel tank, and a groove surface thereof is lowered relative to an adhesion surface of the fuel tank.

In the second aspect of the present invention, the annular groove is formed inside the adhesion part of the base, and the groove surface is lowered relative to the adhesion surface. Accordingly, when a weld residue generated from the base and the fuel tank when the base is welded to the fuel tank flows inside the adhesion part of the base, the groove surface blocks the weld residue. Therefore, the weld residue does not enter an inside wall of the base, so that the weld residue does not prevent the clip from inserting when the base engages the clip.

According to a third aspect of the present invention, in the protective plate installation structure in one of the first and second aspects, the engaging portion includes a pair of plate pieces capable of tilting and provided on a tube of a main body of the clip, and claws formed on tips of the plate pieces. The plate pieces project from an opening formed in the umbrella portion to be capable of approaching with each other, so that the claws are disengaged from the portion to be engaged when the plate pieces approach with each other.

In the third aspect of the present invention, a pair of the plate pieces is provided on the tube of the main body of the clip to be capable of tilting, and the claws are formed on the tips of the plate pieces. The opening is provided in the umbrella portion. When the plate pieces approach with each other through the opening, the claws are disengaged from the portion to be engaged. Accordingly, it is possible to remove the clip from the base for the vehicle maintenance, and it is easy to uninstall the protective plate.

According to a fourth aspect of the present invention, in the protective plate installation structure in one of the first to third aspects, the base is formed of a material same as that of a surface layer of the fuel tank. Accordingly, the base is surely welded to the surface layer of the fuel tank.

As described above, in the first aspect of the present invention, the engaging portion of the clip engages the portion to be engaged of the base when the clip slides along the axis of the base, so that the protective plate is supported between the umbrella portion of the clip and the receiving part of the base. In other words, when the protective plate is installed under or on the side of the fuel tank, an operational direction is one direction. Accordingly, it is easy to operate, and it is possible to install the protective plate in a narrow space.

In the second aspect of the present invention, the annular groove is formed inside the adhesion part of the base, and the groove surface is lowered relative to the adhesion surface. Accordingly, when a weld residue generated from the base and the fuel tank when the base is welded to the fuel tank flows inside the adhesion part of the base, the groove surface blocks the weld residue. Therefore, the weld residue does not enter an inside wall of the base, so that the weld residue does not prevent the clip from inserting when the base engages the clip.

In the third aspect of the present invention, the clip can be easily detached from the base for the vehicle maintenance, so the protective plate is uninstalled easily.

In the fourth aspect of the present invention, the base is formed of the same material as the surface layer of the fuel tank. Accordingly, the base is surely welded to the surface layer of the fuel tank.

DETAILED DESCRIPTION OF PREFERRED EMBODIMENTS

Hereunder, embodiments of the present invention will be explained with reference to the accompanying drawings. An exhaust pipe is provided under or side of the plastic fuel tank located under a vehicle, and radiates radiation heat. A small rock may bounce off from a road and hit the fuel tank. For this reason, a protective plate with heat resistance and impact resistance is provided under or side of the fuel tank to protect the same from the radiation heat and impact.

Figure 1:
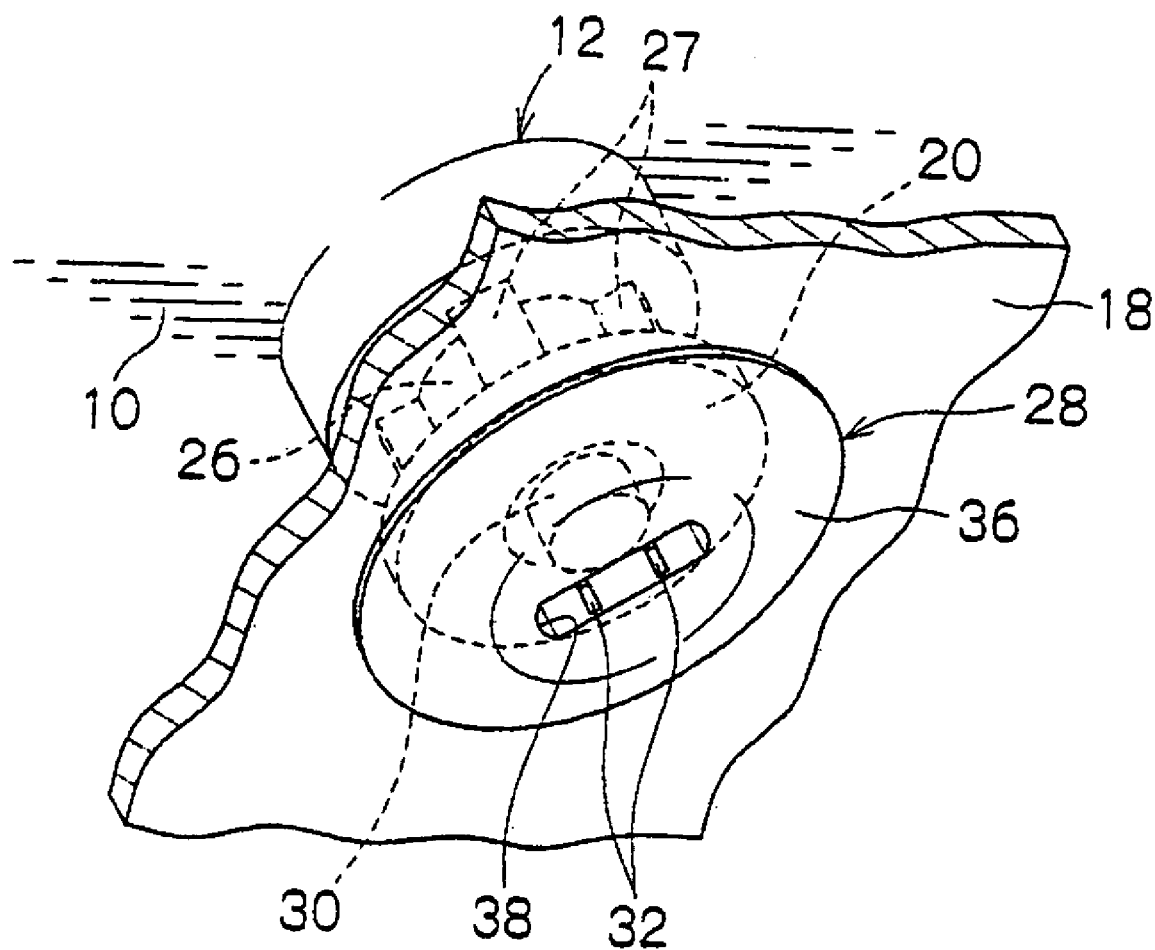
FIG. 1 is a perspective view of a protective plate installation structure according to the present invention.
Figure 2:
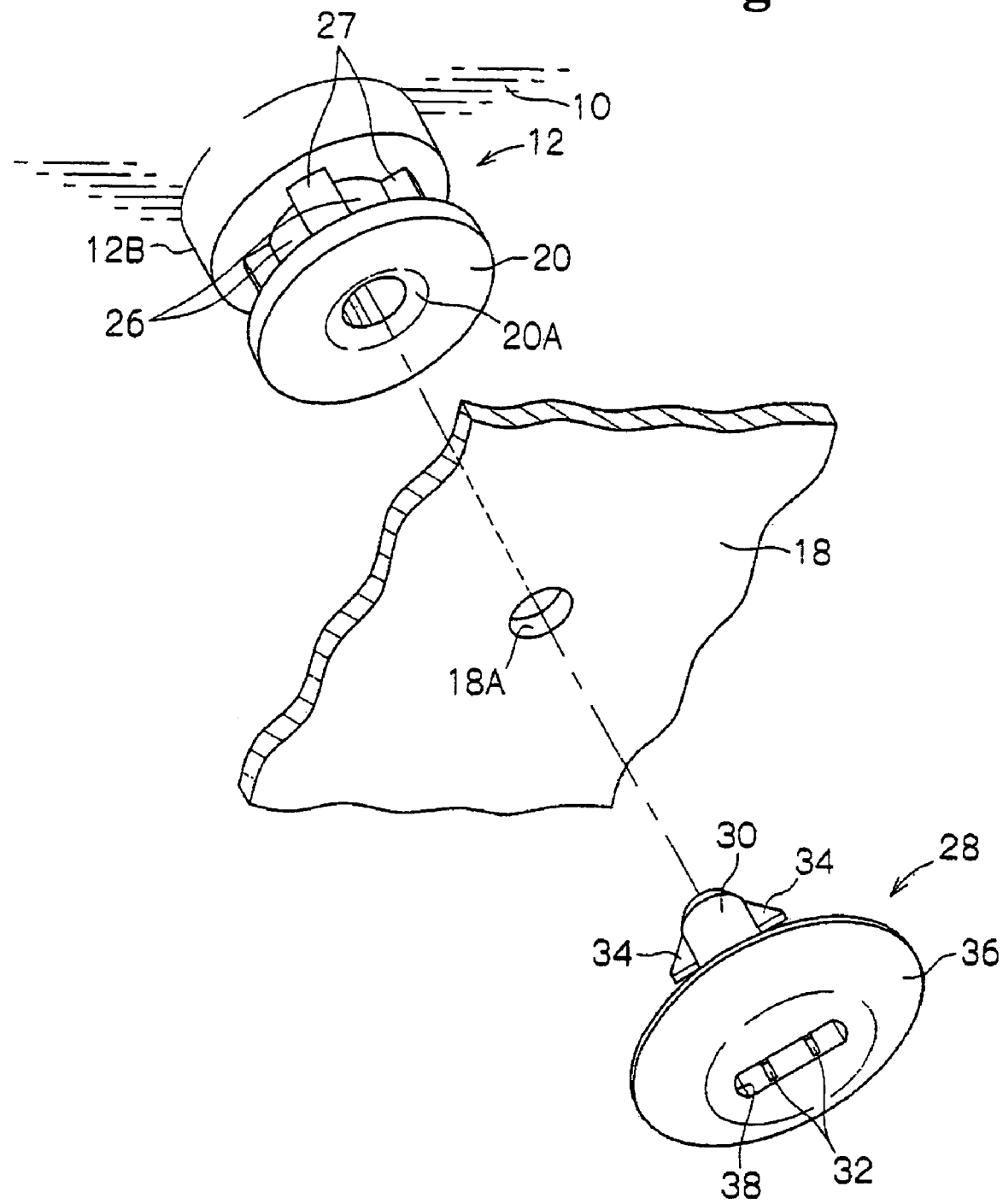
FIG. 2 is an exploded perspective view of the protective plate installation structure according to the present invention.
Figure 3:
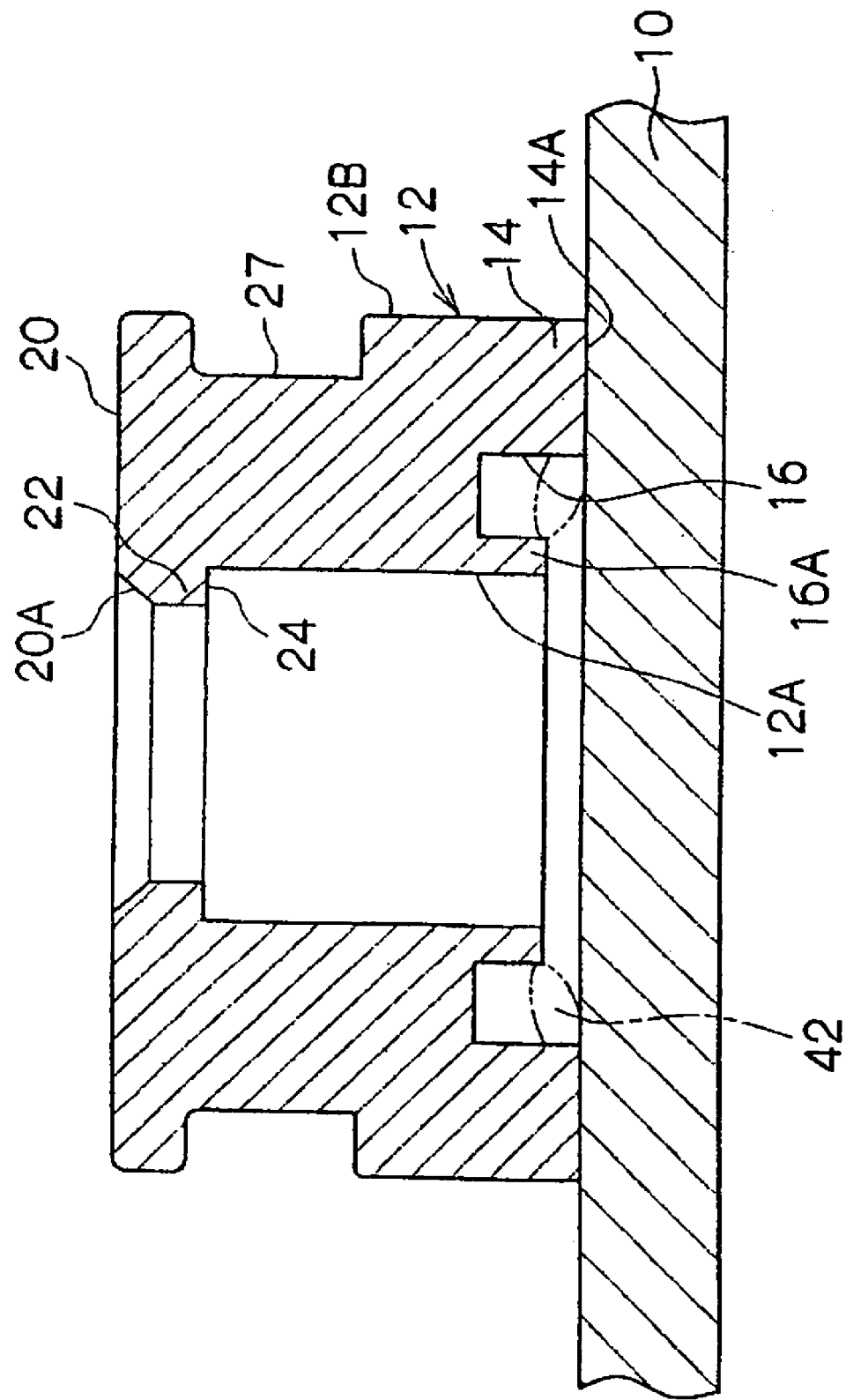
FIG. 3 is a cross-sectional view of the protective plate installation structure in a state that a base is welded to a fuel tank.

A surface layer of the plastic fuel tank 10 shown in FIGS. 1 to 3 is made of polyethylene, and a cylindrical shaped polyethylene base 12 is capable of adhering on the surface of the fuel tank 10. A surface of one side of the base 12 is an adhesion part 14 to be adhered to the fuel tank 10. The surface is melt by frictional heat from spinning, and contacts the surface of the fuel tank 10 to melt each other and solidifies. An annular groove 16 is formed inside the adhesion part 14, and a groove surface 16A of the annular groove is formed lower than the adhesion surface 14A of the adhesion part 14.

The other side surface of the base 12 is a receiving surface 20 capable of contacting the protective plate 18 for protecting the fuel tank 10. The receiving surface 20 of the base 12 has a small diameter (small diameter portion or hole 22), and a step 24 as a portion to be engaged is formed between the small diameter portion 22 and an inner circumference wall 12A. A surface portion 20A is formed on an edge of the inner circumference of the receiving surface 20 (corner portion of the receiving surface 20 of the small diameter portion 22).

Indentation parts 26 are formed in the outer circumference wall 12B of the base 12 along the perimeter direction with a prescribed interval in between. With the indentation parts 26, a perimeter wall is prevented from sinking after molding, and stay parts 27 are formed between indentations 26 for strengthening the base 12.

A clip 28 shown in FIGS. 2 and 4(A) to 4(C) is made of nylon and provided with a cylindrical shape main body 30 capable of inserting the small diameter portion 22, so that the clip 28 can be inserted into an installation opening 18A formed in the protective plate 18. A pair of plate pieces 32 is provided on the main body 30 and capable of tilting relative to the main body 30. At tips of the plate pieces 32, claws 34 project from an outer circumference surface of the main body 30.

When the main body 30 is penetrated through the installation opening 18A of the protective plate 18, the claws 34 contact the installation opening 18A and the plate pieces 32 tilt to reduce a diameter, so that the claws 34 can be penetrated through the installation opening 18A. After the claws 34 penetrate through the installation opening 18A, the claws 34 and the plate pieces 32 are restored.

A distance between the plate pieces 32 is slightly smaller than an inner diameter of the installation opening 18A. Accordingly, when the claws 34 penetrate through the installation opening 18A and the plate pieces 32 restore, end portions of the plate pieces 32 are placed in the installation opening 18A and capable of contacting an inner circumference edge of the installation opening 18A. Outside faces of the plate pieces 32 become flat faces for preventing the clip 28 from rotating, and also preventing the protective plate 18 from displacing horizontally in a state that the plate pieces 32 contact the inner circumference edge of the installation opening 18A.

When the main body 30 is penetrated through the installation opening 18A, the main body 30 can be penetrated through the small diameter portion 22. When the claws 34 pass through the small diameter portion 22, the claws 34 shrink in a diameter, and the plate pieces 32 tilt. After the claws 34 pass through the small diameter portion 22, the plate pieces 32 and the claws 34 restore.

In a state that the plate pieces 32 and the claws 34 restore, the upper surfaces 34A of the claws 34 abut against the lower surface 24A of the step 24, so that the clip 28 engages the base 12. Top portions of the claws 34 (not shown) have a curvature radius same as the inside diameter of the inner circumference wall 12A of the base 12. Accordingly, the upper surfaces 34A of the claws 34 can evenly contact the lower surface 24A of the step 24 over a width direction of the upper surfaces 34A of the claws 34.

Figure 5A:
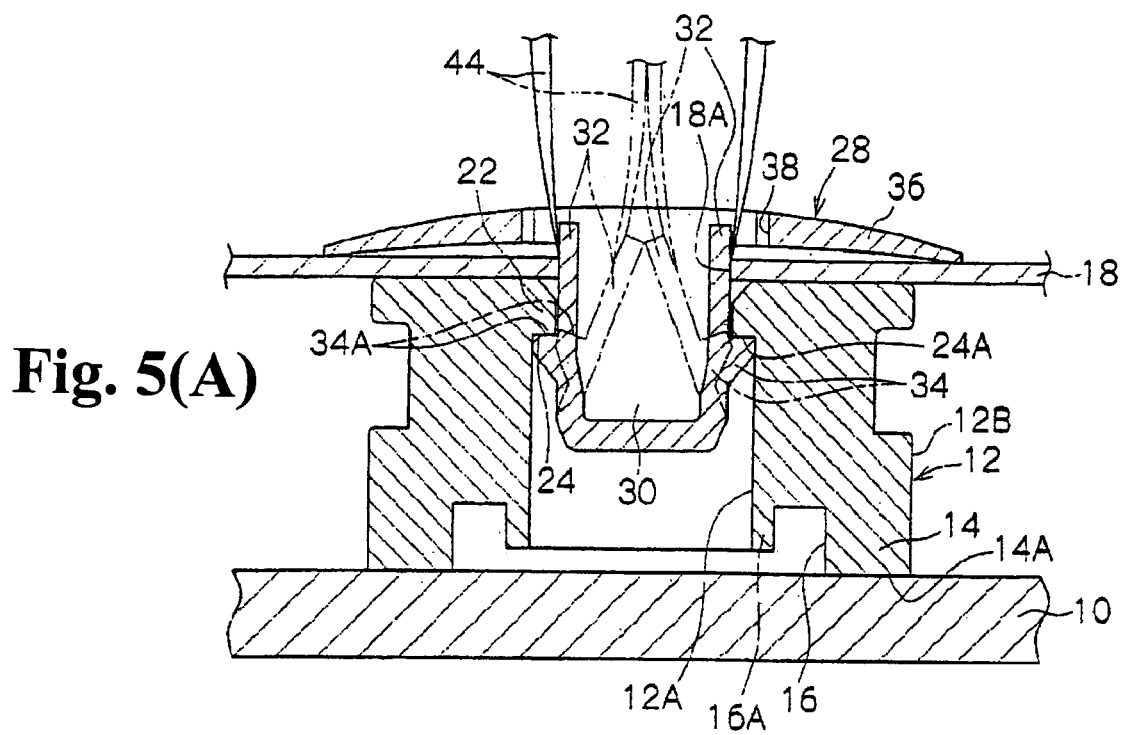
FIGS. 5(A) and 5(B) are cross-sectional views of the protective plate installation structure in a state that the clip is removed from the base.
Figure 5B:
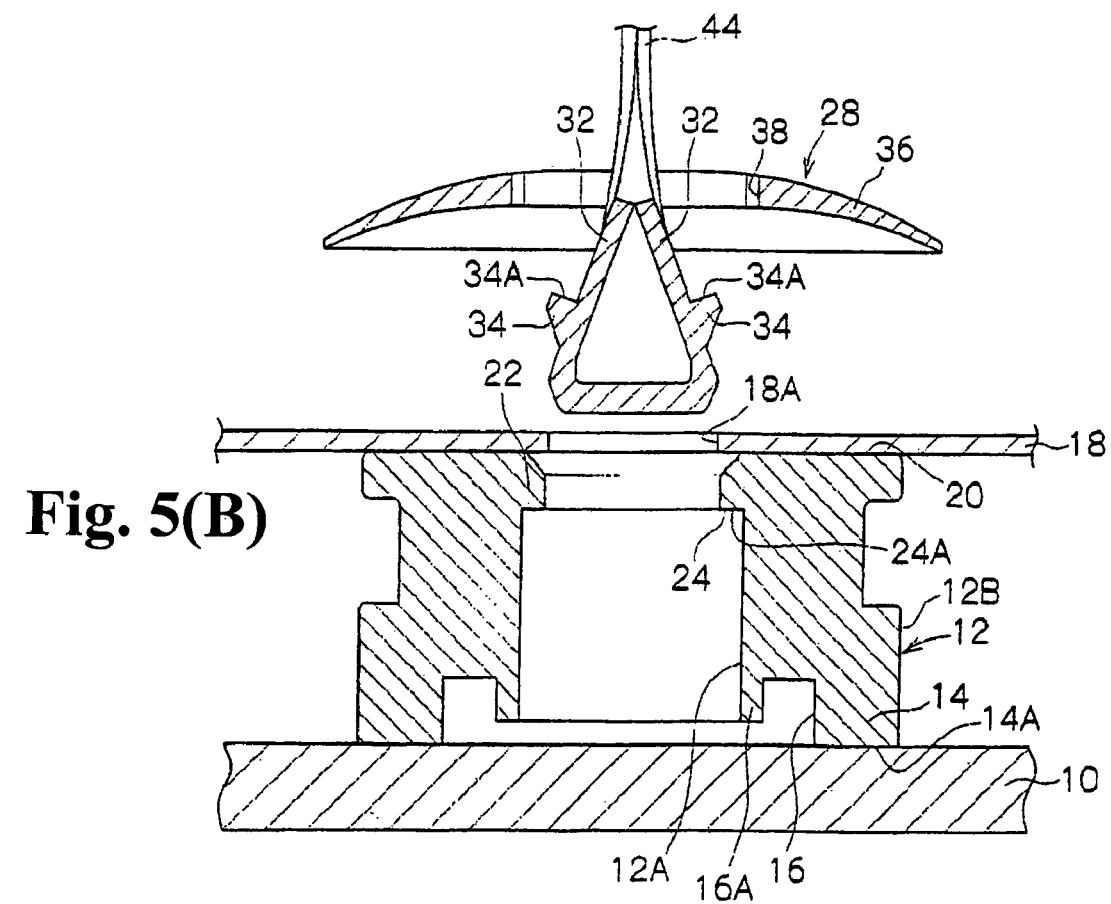
Figure 6:
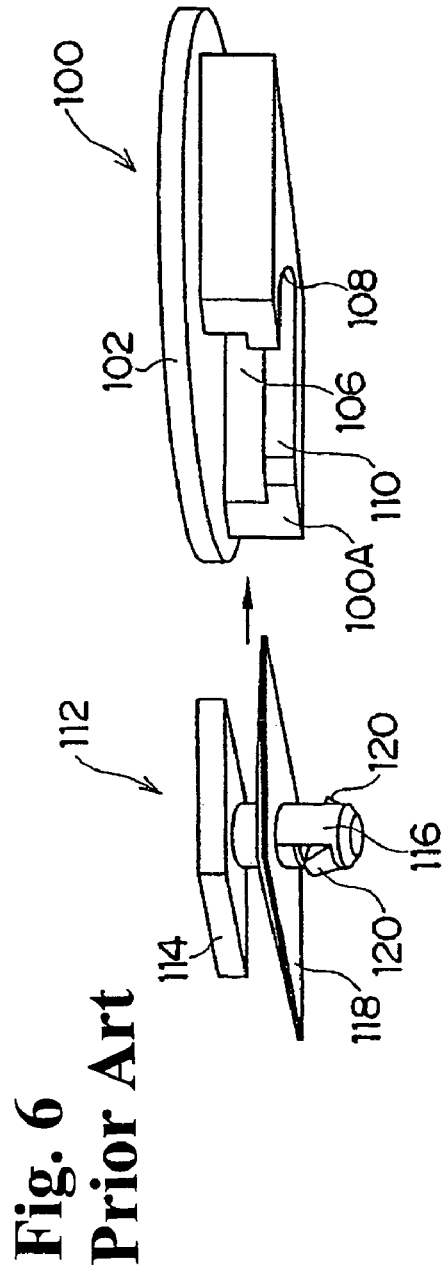
FIG. 6 is an exploded perspective view of a conventional protective plate installation structure.
Figure 7:
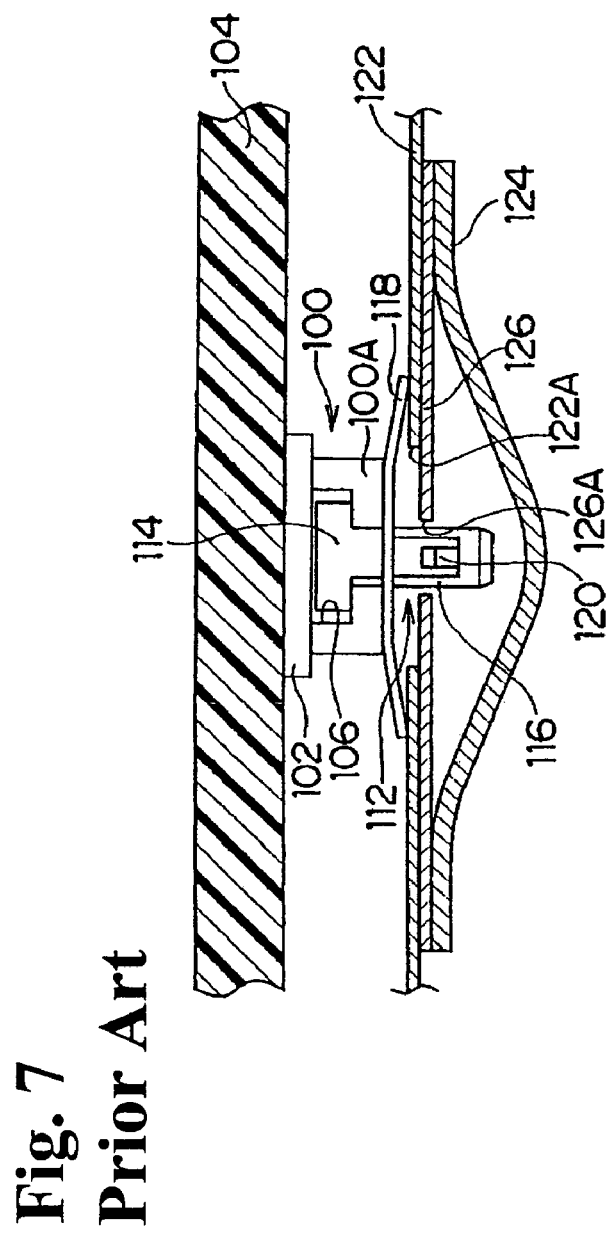
FIG. 7 is a cross-sectional view of the conventional protective plate installation structure.

An umbrella portion 36 with a conical shape is provided on the other side of the main body 30. As shown in FIGS. 5(A) and 5(B), the umbrella portion 36 has an end thinner than a base, so that the end elastically deforms more. In a state that the claws 34 engage the step 24, the umbrella portion 36 supports the protective plate 18 with the receiving surface 20, and the end portion of the umbrella 36 presses the protective plate 18 against the receiving surface 20, thereby strongly holding the protective plate 18.

An opening 38 is formed at a middle of the umbrella 36, and the end portions of the plate pieces 32 are exposed through the opening 38. The opening 38 is formed as an elongated opening longer than the interval of the plate pieces 32. Accordingly, it is possible to insert a tool such as a forceps 44 outside the plate pieces 32. The forceps 44 moves the ends of the plate pieces 32 close together through the opening 38, thereby tilting the plate pieces 32.

Figure 4A:
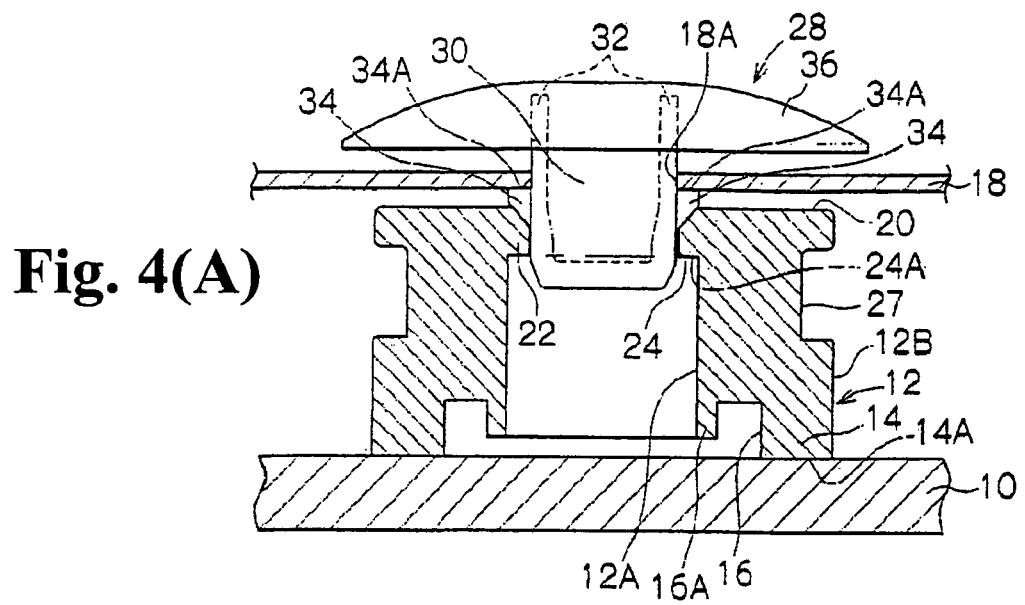
FIGS. 4(A) to 4(C) are cross-sectional views of the protective plate installation structure in a state that the protective plate is attached to a base with a clip.
Figure 4B:
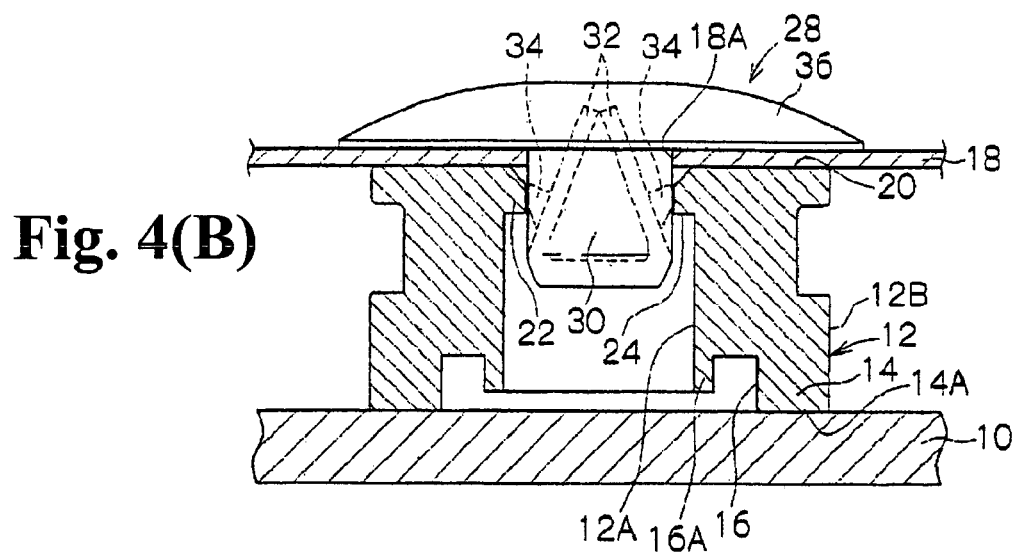
Figure 4C:
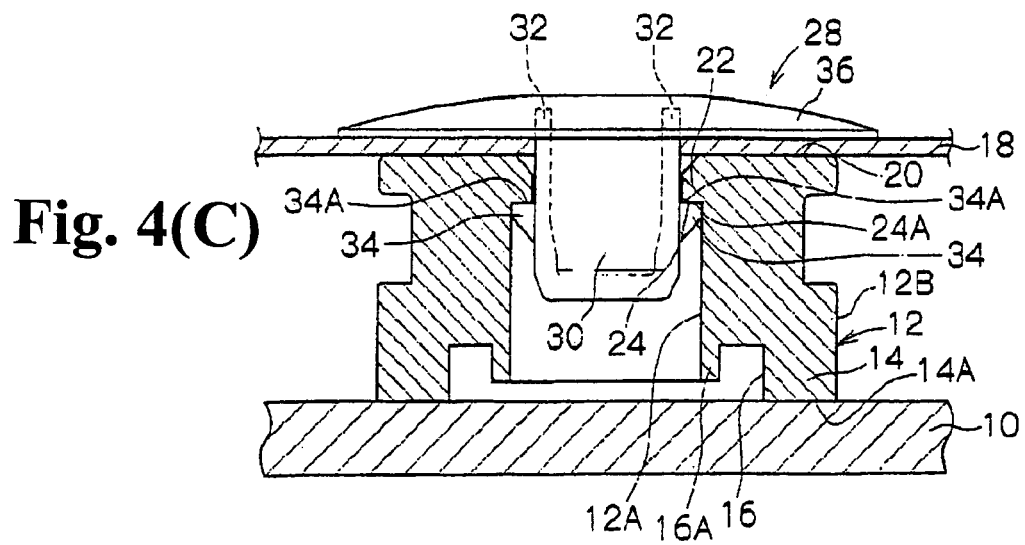

An effect of the protective plate installation according to the present invention will be described in detail next. As shown in FIGS. 4(A) to 4(C), the small diameter portion 22 is provided on the receiving surface 20 of the base 12, and the step 24 (portion to be engaged) is formed between the inner circumference wall 12A and the small diameter portion 22, so that the claws 34 of the clip 28 engage the step 24. Accordingly, the claws 34 can engage any part of the step 24 in any perimeter direction, thereby improving workability.

The tips of the claws 34 have a curvature radius same as an inner diameter of the inner circumference wall 12A of the base 12, so that the upper surfaces 34A of the claws 34 evenly contact the lower surface 24A of the step 24 across a width direction of the upper surfaces 34A of the claws 34, thereby obtaining strong engagement between the clip 28 and the base 12.

As shown in FIG. 2 and FIG. 4(A) to 4(C), when the clip 28 slides along the axis of the base 12, the claws 34 engage the step 24, so that the protective plate 18 is supported between the receiving surface 20 of the base 12 and the umbrella portion 36. That is, when the protective plate 18 is installed on a side or under the fuel tank, an operation direction is one direction. Accordingly, the operation is easy and it is possible to install the protective plate 18 in a narrow space.

As shown in FIG. 3, the annular groove 16 is formed inside the adhesion part 14 of the base 12, and the groove surface 16A is lower than the adhesion surface 14A. When the base 12 and the fuel tank 10 are welded, a weld residue 42 is formed and flows inside the adhesion part 14 of the base 12. In this case, the groove surface 16A blocks the weld residue 42 not to enter the inside wall 12A of the base 12, and not to interrupt the clip 28 from inserting.

The base 12 is made of polyethylene, i.e., a same material as a surface of the fuel tank 10. Accordingly, when the base 12 adheres with the fuel tank 10, the surface of the base 12 and the fuel tank 10 melt in a same way, so that the base 12 can be adhered surely.

The clip 28 is placed outside the protective plate 18, i.e., a side of an exhaust pipe (not shown), and is made of nylon with high heat resistance. Nylon has lower impact resistance as compared with polyethylene, i.e., the material of the base 12. Accordingly, when the protective plate 18 receives an excessive amount of impact, the clip 28 is broken before the base 12. Accordingly, when the protective plate 18 receives an impact larger than a prescribed amount, the clip 28 absorbs the impact and is broken, thereby preventing the impact from transmitting to the base 12. When the protective plate 18 receives the impact larger than the prescribed amount, the main body 30 of the clip 28 located inside the installation opening 18A of the protective plate 18 also absorbs the impact, so that a connected portion between the umbrella 36 and the main body 20 is broken. As described above, when the protective plate 18 receives the impact larger than the prescribed amount, the clip 28 is broken, thereby preventing the impact from transmitting to the fuel tank 10 through the base 12.

The opening 38 is formed at the middle of the umbrella portion 36, and the end portions of the plate pieces 32 are exposed through the opening 38, so that the plate pieces 32 get close each other through the opening 38. Accordingly, it is possible to tilt the plate pieces 32 and remove the claws 34 from the step 24 through the opening 38, thereby removing the clip 28 from the base 12. Therefore, the protective plate 18 can be removed easily for the vehicle maintenance.

In the embodiment, the base 12 and the surface layer of the fuel tank 10 are made of polyethylene. The material is not limited thereto as far as the base 12 is securely adhered to the fuel tank 10. The base 12 is made of polyethylene and the clip 28 is made of nylon. Alternatively, the base 12 and the clip 28 may be made of a same material as far as the base 12 has mechanical strength stronger than that of the clip 28.

The disclosure of Japanese Patent Application No. 2004-165755, filed on Jun. 3, 2004, is incorporated in the application.

While the invention has been explained with reference to the specific embodiments of the invention, the explanation is illustrative and the invention is limited only by the appended claims.

What is claimed is:

1. A protective plate installation structure, comprising:
   a base to be welded to a protection member and having an insertion hole with a first engaging portion therein, and a receiving portion,
   a clip for engaging the base, said clip having a second engaging portion at one end so that the second engaging portion engages the first engaging portion when a central axis of the clip is aligned with a central axis of the insertion hole and the clip is inserted into the insertion hole along the central axes, and an umbrella portion formed at the other end thereof, and
   a protective plate for protecting the protection member, said protective plate having an installation opening so that when the clip is attached to the base through the installation opening, the protective plate is held between the umbrella portion and the receiving portion.

2. A protective plate installation structure according to claim 1, wherein said first engaging portion is formed at an inner edge of the insertion hole.

3. A protective plate installation structure according to claim 1, wherein said insertion hole is arranged perpendicular to an outer surface of the receiving portion.

4. A protective plate installation structure according to claim 3, wherein said insertion hole is arranged perpendicular to the protection member so that the clip does not move laterally when inserted into the insertion hole of the base.

5. A protective plate installation structure, comprising:
- a base to be welded to a protection member and having an insertion hole, a first engaging portion formed at an inner edge of the insertion hole, and a receiving portion, wherein said base has a cylindrical shape and further includes an annular groove inside insertion hole at a side of the protection member, said annular groove having a groove wall situated away from the member to be protected,
- a clip for engaging the base, said clip having a second engaging portion at one end for engaging the first engaging portion when the clip is inserted along an axis of the base, and an umbrella portion formed at the other end thereof, and
- a protective plate for protecting the protection member, said protective plate having an installation opening so that when the clip is attached to the base through the installation opening, the protective plate is held between the umbrella portion and the receiving portion.

6. A protective plate installation structure according to claim 5, wherein said second engaging portion includes a pair of plate pieces capable of bending relative to the clip and claws formed on tip portions of the plate pieces, said umbrella portion having an opening for bending the plate pieces so that when the plate pieces become close together, the claws are engaged with and disengaged from the first engaging portion.

7. A protective plate installation structure according to claim 6, wherein said base is formed of a plastic same as that of the protection member.

8. A protective plate installation structure according to claim 7, wherein said clip is formed of a plastic.

* * * * *